(12) United States Patent
Park

(10) Patent No.: US 10,838,766 B2
(45) Date of Patent: Nov. 17, 2020

(54) MEMORY SYSTEM AND OPERATING METHOD THEREOF

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 210 days.

(21) Appl. No.: 16/014,703

(22) Filed: Jun. 21, 2018

(65) Prior Publication Data

US 2019/0163534 A1 May 30, 2019

(30) Foreign Application Priority Data

Nov. 29, 2017 (KR) .......................... 10-2017-0161591

(51) Int. Cl.
*G06F 9/48* (2006.01)
*G06F 9/50* (2006.01)

(52) U.S. Cl.
CPC .......... *G06F 9/4887* (2013.01); *G06F 9/4881* (2013.01); *G06F 9/50* (2013.01); *G06F 9/5038* (2013.01); *G06F 2209/5021* (2013.01); *G06F 2209/548* (2013.01)

(58) Field of Classification Search
None
See application file for complete search history.

(56) References Cited

U.S. PATENT DOCUMENTS

| | | | | |
|---|---|---|---|---|
| 2009/0055829 A1* | 2/2009 | Gibson | ................. | G06F 9/4881 718/103 |
| 2010/0293551 A1* | 11/2010 | Ajima | ................... | G06F 9/4881 718/104 |
| 2018/0173577 A1* | 6/2018 | Stanfill | ................. | G06F 9/4881 |

FOREIGN PATENT DOCUMENTS

KR 1020120087980 8/2012

* cited by examiner

*Primary Examiner* — Qing Yuan Wu
(74) *Attorney, Agent, or Firm* — IP & T Group LLP

(57) ABSTRACT

A memory system includes a controller configured to store start time stamps of a plurality of tasks, determine a delayed task among the tasks by performing a delay check operation based on an end time stamp of a current task and the start time stamps, and assign a priority to the delayed task.

20 Claims, 8 Drawing Sheets

MEMORY SYSTEM AND OPERATING METHOD THEREOF

CROSS-REFERENCES TO RELATED APPLICATION

The present application claims priority under 35 U.S.C. § 119(a) to Korean application number 10-2017-0161591, filed on Nov. 29, 2017, which is incorporated herein by reference in its entirety.

BACKGROUND

1. Technical Field

Various embodiments generally relate to a memory system, and, more particularly, to a memory system including a nonvolatile memory device.

2. Related Art

Memory systems store data provided by an external device in response to a write request. Memory systems may also provide stored data to an external device in response to a read request. Examples of external devices that use memory systems include computers, digital cameras, cellular phones and the like. Memory systems may be embedded in an external device during manufacturing of the external devices or may be fabricated separately and then connected afterwards to an external device.

SUMMARY

In an embodiment, a memory system may include: a controller configured to store start time stamps of a plurality of tasks, determine a delayed task among the tasks by performing a delay check operation based on an end time stamp of a current task and the start time stamps, and assign a priority to the delayed task.

In an embodiment, a method for operating a memory system may include: storing start time stamps of a plurality of tasks; determining a delayed task among the tasks by performing a delay check operation based on an end time stamp of a current task and the start time stamps; and assigning a priority to the delayed task.

In an embodiment, a memory device may include: a memory device; and a controller suitable for queuing tasks in priority and normal queues according to priorities of the tasks, and controlling the memory device to perform operations primarily according to queued order of the tasks in the priority queue and secondarily according to queued order of the tasks in the normal queue, wherein the controller moves and queues into the priority queue a task queued in the normal queue when a difference between an end time of a currently completed task and a start time of the task queued in the normal queue is longer than a predetermined time.

BRIEF DESCRIPTION OF THE DRAWINGS

The above and other features and advantages of the present invention will become more apparent to those skilled in the art to which the present invention belongs by describing various embodiments thereof with reference to the attached drawings in which.

DETAILED DESCRIPTION

Figure 1:
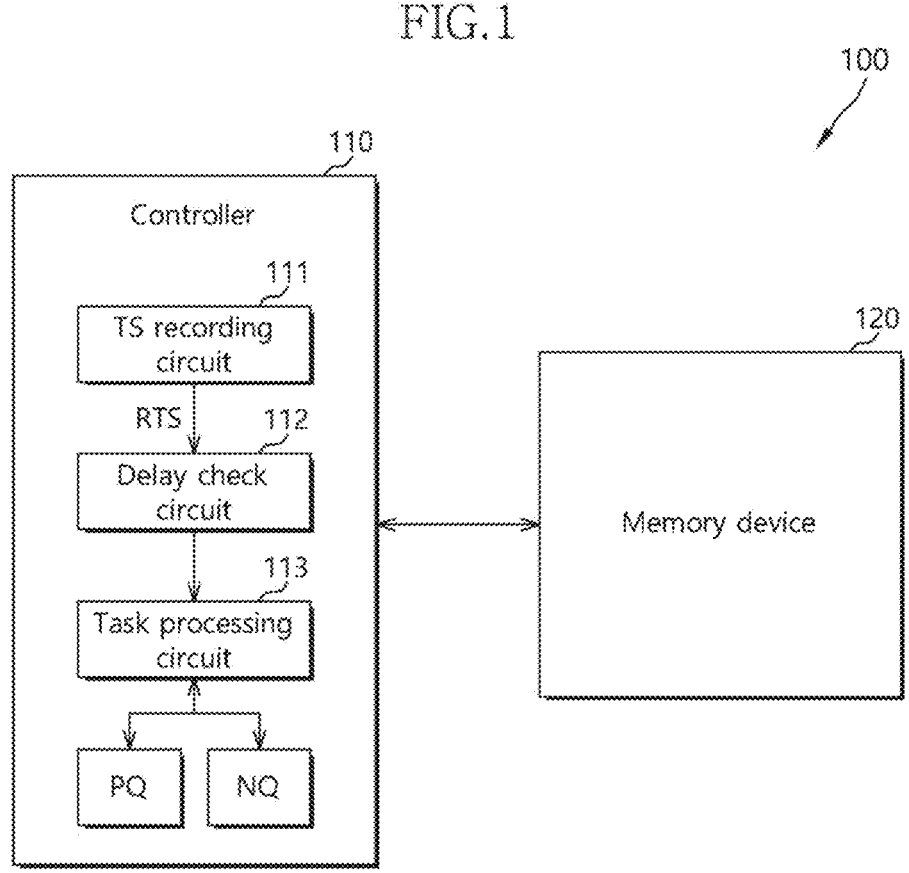
FIG. 1 is a block diagram illustrating an example of a memory system in accordance with an embodiment.

Hereinafter, a memory system and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms as well, unless the context clearly indicates otherwise. It will be further understood that the terms "comprises," "comprising," "includes," and "including"

when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present is invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

FIG. 1 is a block diagram illustrating a memory system 100 in accordance with an embodiment.

The memory system 100 may be configured to store the data provided from an external host device, in response to a write request from the host device. Also, the memory system 100 may be configured to provide stored data to the host device, in response to a read request from the host device.

The memory system 100 may be configured by a Personal Computer Memory Card International Association (PCM-CIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD) and the like.

The memory system 100 may include a controller 110 and a memory device 120.

The controller 110 may control the general operations of the memory system 100. The controller 110 may access the memory device 120 to process a request from the host device. Also, the controller 110 may access the memory device 120 to perform an internal management operation or a background operation of the memory system 100 regardless of a request of the host device. An access to the memory device 120 may include a write access and a read access. The controller 110 may access the memory device 120 by controlling a write operation and a read operation of the memory device 120. The controller 110 may process internal operations through dividing the internal operations by the unit of task.

The controller 110 may include a priority queue PQ, a normal queue NQ, a time stamp (TS) recording circuit 111, a delay check circuit 112 and a task processing circuit 113.

The priority queue PQ and the normal queue NQ may queue a plurality of tasks to be executed by the task processing circuit 113.

The task processing circuit 113 may execute the tasks queued in the priority queue PQ and the normal queue NQ depending on the priorities of the tasks and the order in which the tasks are generated. In detail, a task queued in the priority queue PQ, that is, a high priority task, may be executed prior to a task queued in the normal queue NQ, that is, a normal task. The task processing circuit 113 may execute a normal task when a high priority task does not exist in the priority queue PQ. High priority tasks may be sequentially executed according to the order in which they are queued in the priority queue PQ. Normal tasks may be sequentially executed according to the order in which they are queued in the normal queue NQ. The priorities of tasks may be assigned by the host device or may be assigned depending on the management policy of the controller 110.

When high priority tasks are successively generated and thus the execution of a normal task which is generated earlier than the high priority tasks is delayed, the normal task may be placed in a starvation state. As will be described later, the delay check circuit 112 may prevent the starvation state of a task through a delay check operation, thereby preventing the performance of the memory system 100 from deteriorating.

The TS recording circuit 111 may store start time stamps RTS of the tasks queued in the priority queue PQ and the normal queue NQ. The start time stamps RTS may indicate generation times of the corresponding tasks.

The delay check circuit 112 may perform a delay check operation for tasks that are not executed yet, by comparing the end time stamp of a task of which execution is currently completed and the start time stamps RTS of the tasks stored in the TS recording circuit 111. The end time stamp may be generated at the end time of the current task through a timer. The task processing circuit 113 may preferentially execute a delayed task among the tasks that are not executed yet, based on a result of the delay check operation.

In order to substantially prevent a starvation state of a normal task, tasks for which a delay check operation is to be performed may be limited to normal tasks. That is, the delay check circuit 112 may perform a delay check operation for normal tasks, by comparing the end time stamp of a task of which execution is currently completed and the start time stamps RTS of the normal tasks. The task processing circuit 113 may preferentially execute a delayed normal task among normal tasks that are not executed yet, based on a result of the delay check operation.

In detail, when execution of a current task is completed, the delay check circuit 112 may calculate the delay times of normal tasks by comparing the end time stamp of the current task and the respective start time stamps RTS of the normal tasks. The delay time of a normal task may be the difference between the end time stamp of the current task and the start time stamp RTS of the corresponding normal task.

The delay check circuit 112 may determine a delayed normal task based on the delay times. The delay check circuit 112 may determine a delayed normal task by comparing the delay times with a delay threshold time. The delay check circuit 112 may determine that a normal task of which delay time exceeds the delay threshold time is delayed.

The task processing circuit 113 may queue the delayed normal task in the priority queue PQ, and may execute the delayed normal task depending on the order in which the delayed normal task is queued in the priority queue PQ. According to an embodiment, the task processing circuit 113 may execute, prior to high priority tasks, a normal task that is determined as being delayed through the delay check operation. The task processing circuit 113 may delete the delayed normal task from the normal queue NQ when queuing the delayed normal task in the priority queue PQ.

If it is determined in the delay check operation of the delay check circuit 112 that there is no delayed normal task, the task processing circuit 113 may execute the tasks queued in the priority queue PQ and the normal queue NQ depending on the priorities of the tasks and orders in which the tasks are queued.

According to an embodiment, the delay check circuit 112 may perform a delay check operation each time the execution of a task is ended. A delay check operation may be performed when the execution of a high priority task is ended or when the execution of a normal task is ended.

According to an embodiment, when execution of a current task is ended, the delay check circuit 112 may selectively perform a delay check operation based on the end time stamp of the current task and the start time stamp RTS of the current task.

In detail, the delay check circuit 112 may calculate the execution time of a current task based on the end time stamp of the current task and the start time stamp RTS of the current task. The execution time of a current task may be the difference between the end time stamp of the current task and the start time stamp RTS of the current task.

Successively, the delay check circuit 112 may selectively perform the delay check operation by comparing the execution time of the current task with a check threshold time. In detail, the delay check circuit 112 may perform the delay check operation when the execution time of the current task exceeds the check threshold time. The delay check circuit 112 may skip the delay check operation when the execution time of the current task does not exceed the check threshold time. When the delay check operation is skipped, the task processing circuit 113 may execute a next task depending on orders in which tasks are queued in each of the priority queue PQ and the normal queue NQ.

Therefore, the delay check circuit 112 may adjust an overhead due to a delay check operation, by skipping the delay check operation.

According to an embodiment, each time the execution of a high priority task or a normal task is ended, the delay check circuit 112 may determine whether to perform a delay check operation, according to the above-described method, and may selectively perform a delay check operation depending on a determination.

While not shown, the controller 110 may further include a timer which determines the start time stamp RTS and the end time stamp of a task and provides the determined start time stamp RTS and end time stamp to the TS recording circuit 111 and the delay check circuit 112.

The controller 110 may classify a task into any one of two levels of priorities, that is, a high priority task and a normal task. However, according to an embodiment, the controller 110 may execute tasks by classifying them into at least three levels of priorities. In this case, a task that is determined, through a delay check operation, as being delayed may be adjusted to have a priority of a level higher than a current priority and may then be executed.

The memory device 120 may store the data transmitted from the controller 110 and may read out stored data and transmit the read-out data to the controller 110, according to the control of the controller 110.

The memory device 120 may be a nonvolatile memory device. The nonvolatile memory device may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

The memory device 120 may be a volatile memory device. The volatile memory device may include a Dynamic Random Access Memory (DRAM), a Synchronous Dynamic Random Access Memory (SDRAM), a Static Random Access Memory (SRAM), and the like.

While it is illustrated in FIG. 1 that the memory system 100 includes one memory device 120, it is to be noted that the number of memory devices included in the memory system 100 is not limited thereto.

Figure 2:
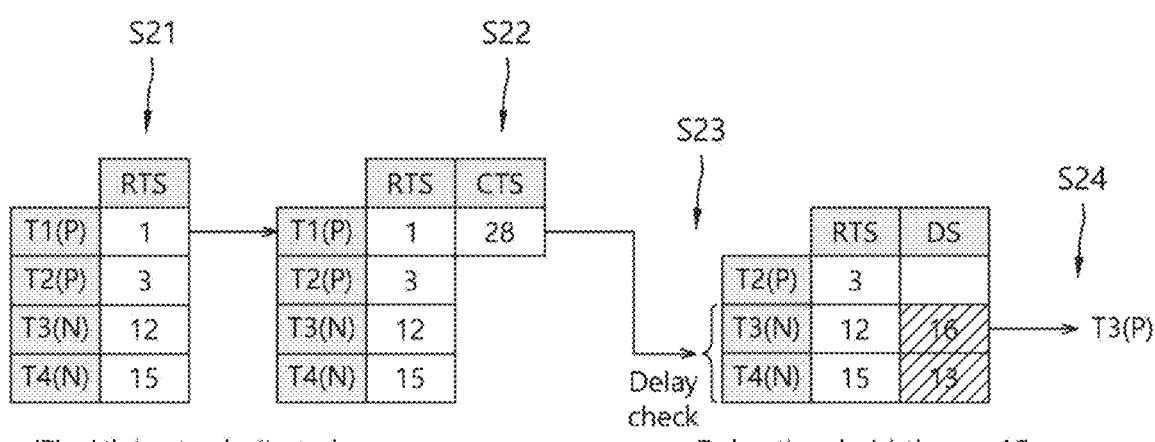
FIG. 2 is a diagram illustrating a method for operating the memory system of FIG. 1, in accordance with an embodiment.

FIG. 2 is an example of a method for operating the memory system 100 in accordance with an embodiment.

Referring to FIG. 2, at step S21, the TS recording circuit 111 may record, when a first task T1 to a fourth task T4 are generated, the respective start time stamps RTS thereof. The start time stamps RTS shown in FIG. 2 may be expressed as relative values. The first task T1 and the second task T2 may be high priority tasks. The third task T3 and the fourth task T4 may be normal tasks.

At step S22, the task processing circuit 113 may execute the first task T1 according to the priority thereof and the order in which it is queued. The delay check circuit 112 may obtain an end time stamp CTS of "28" of the first task T1 when the execution of the first task T1 is ended.

At step S23, the delay check circuit 112 may perform a delay check operation for the third task T3 and the fourth task T4 being normal tasks. The delay check circuit 112 may calculate delay times DS based on the end time stamp CTS of the first task T1 and the start time stamps RTS of the third task T3 and the fourth task T4. The delay times DS may be the differences between the end time stamp CTS of the first task T1 and the start time stamps RTS of the third task T3 and the fourth task 14. For example, the delay time DS of the third task T3 may be "16" as the difference between "28" as the end time stamp CTS of the first task T1 and "12" as the start time stamp RTS of the third task T3.

The delay check circuit 112 may determine a delayed task by comparing the delay times DS and a delay threshold time "15." The delay check circuit 112 may determine that the third task T3 of which delay time DS of "16" exceeds the delay threshold time "15" is delayed. The delay check circuit 112 may determine that the fourth task T4 of which delay time DS of "13" does not exceed the delay threshold time "15" is not delayed.

At step S24, the task processing circuit 113 may queue the delayed third task T3 in the priority queue PQ. The task processing circuit 113 may execute the third task T3 depending on the order in which the third task T3 is queued in the priority queue PQ. The task processing circuit 113 may execute the fourth task T4 after executing all of the high priority tasks of the priority queue PQ.

Figure 3:
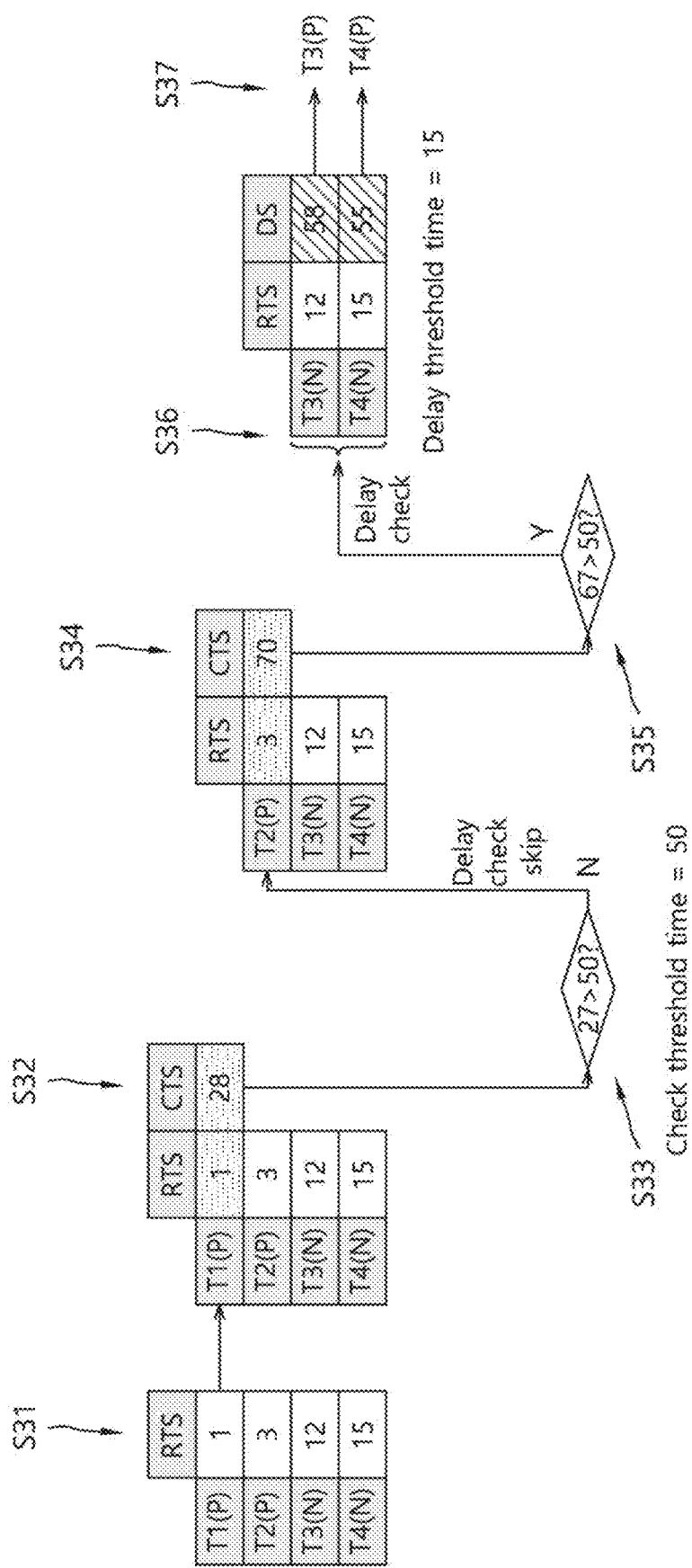
FIG. 3 is a diagram illustrating a method for operating the memory system of FIG. 1, in accordance with an embodiment.

FIG. 3 is an example of a method for operating the memory system 100 in accordance with an embodiment.

Referring to FIG. 3, at step S31, the TS recording circuit 111 may record, when a first task T1 to a fourth task T4 are generated, the respective start time stamps RTS thereof. The start time stamps RTS shown in FIG. 3 may be expressed as relative values. The first task T1 and the second task T2 may be high priority tasks. The third task T3 and the fourth task T4 may be normal tasks.

At step S32, the task processing circuit 113 may execute the first task T1 according to the priority thereof and the order in which it is generated. The delay check circuit 112 may obtain an end time stamp CTS of "28" of the first task T1 when the execution of the first task T1 is ended.

At step S33, the delay check circuit 112 may determine whether to skip a delay check operation, based on the end time stamp CTS of the first task T1 and the start time stamp RTS of the first task T1. In detail, the delay check circuit 112 may calculate the difference between the end time stamp CTS of "28" of the first task T1 and the start time stamp RTS of "1" of the first task T1, that is, "27," as the execution time of the first task T1. The delay check circuit 112 may compare the execution time "27" of the first task T1 with a check threshold time "50." The delay check circuit 112 may skip the delay check operation since the execution time "27" of the first task T1 does not exceed the check threshold time "50."

At step S34, the task processing circuit 113 may execute the second task T2 according to the priority thereof and the order in which it is generated. The delay check circuit 112 may obtain an end time stamp CTS of "70" of the second task T2 when the execution of the second task T2 is ended.

At step S35, the delay check circuit 112 may determine whether to skip a delay check operation, based on the end time stamp CTS of the second task T2 and the start time stamp RTS of the second task T2. In detail, the delay check circuit 112 may calculate the difference between the end time stamp CTS of "70" of the second task T2 and the start time stamp RTS of "3" of the second task T2, that is, "67," as the execution time of the second task T2. The delay check circuit 112 may compare the execution time "67" of the second task T2 with the check threshold time "50." The delay check circuit 112 may perform the delay check operation since the execution time "67" of the second task T2 exceeds the check threshold time "50."

At step S36, the delay check circuit 112 may perform the delay check operation for the third task T3 and the fourth task T4 being normal tasks. The delay check circuit 112 may calculate delay times DS based on the end time stamp CTS of the second task T2 and the start time stamps RTS of the third task T3 and the fourth task T4. The delay times DS may be the differences between the end time stamp CTS of the second task T2 and the start time stamps RTS of the third task T3 and the fourth task T4. For example, the delay time DS of the third task T3 may be "58" as the difference between "70" as the end time stamp CTS of the second task T2 and "12" as the start time stamp RTS of the third task T3.

The delay check circuit 112 may determine a delayed task by comparing the delay times DS and the delay threshold time "15." The delay check circuit 112 may determine that the third task T3 and the fourth task T4 of which delay times DS exceed the delay threshold time "15" are delayed.

At step S37, the task processing circuit 113 may queue the delayed third task T3 and fourth task T4 in the priority queue PQ. The task processing circuit 113 may execute the third task T3 and the fourth task T4 depending on the order in which the third task T3 and the fourth task T4 are queued in the priority queue PQ.

Figure 4:
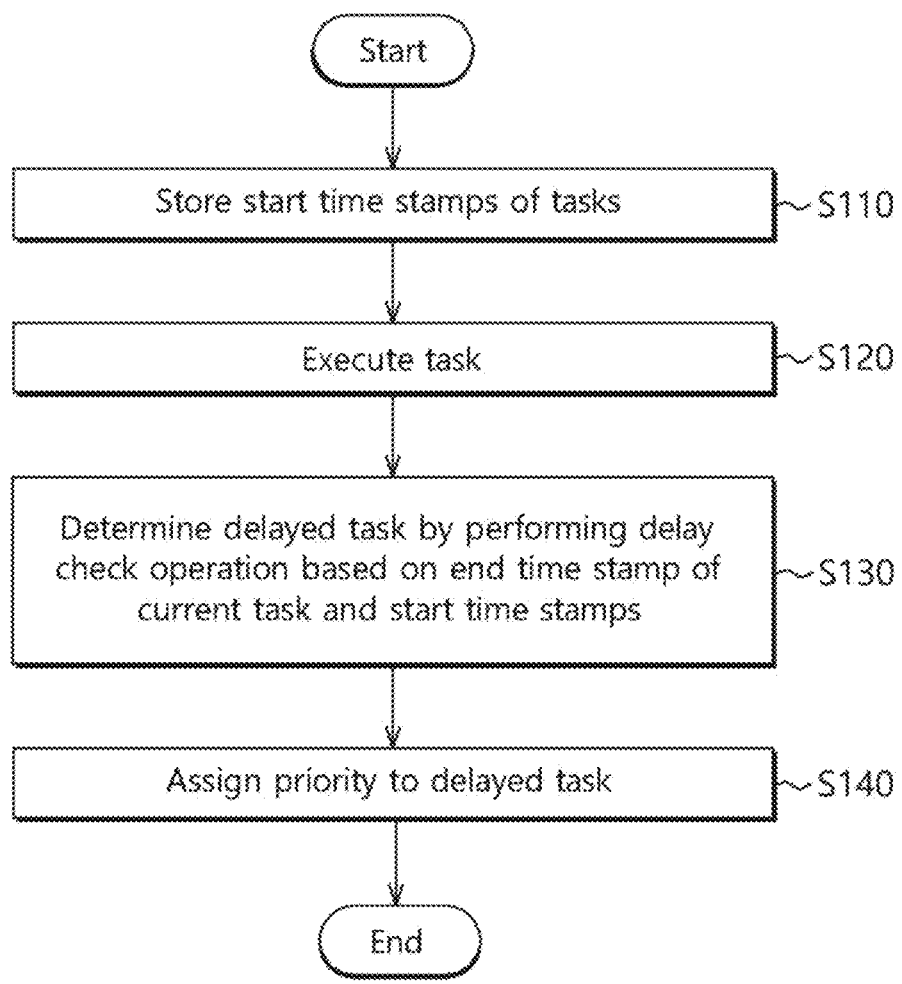
FIG. 4 is a flow chart illustrating a method for operating the memory system of FIG. 1, in accordance with an embodiment.

FIG. 4 is an example of a flow chart of a method for operating the memory system 100 of FIG. 1 in accordance with an embodiment.

Referring to FIG. 4, at step S110, the TS recording circuit 111 may store the start time stamps RTS of generated tasks.

At step S120, the task processing circuit 113 may execute a task. The task processing circuit 113 may execute the task depending on the priority thereof and the order in which the task is queued.

At step S130, the delay check circuit 112 may determine a delayed task by performing a delay check operation based on the end time stamp of the current task and start time stamps RTS. When performing the delay check operation, the delay check circuit 112 may calculate the delay times of tasks by comparing the end time stamp and the respective start time stamps RTS, and may determine a delayed task based on the delay times. The delay check circuit 112 may determine a delayed task by comparing the respective delay times with a delay threshold time. The delay check circuit 112 may perform the delay check operation for only normal tasks.

At step S140, the task processing circuit 113 may assign a priority to a delayed task. The task processing circuit 113 may queue the delayed task in the priority queue PQ, and may execute the delayed task depending on the order in which the delayed task is queued in the priority queue PQ.

Figure 5:
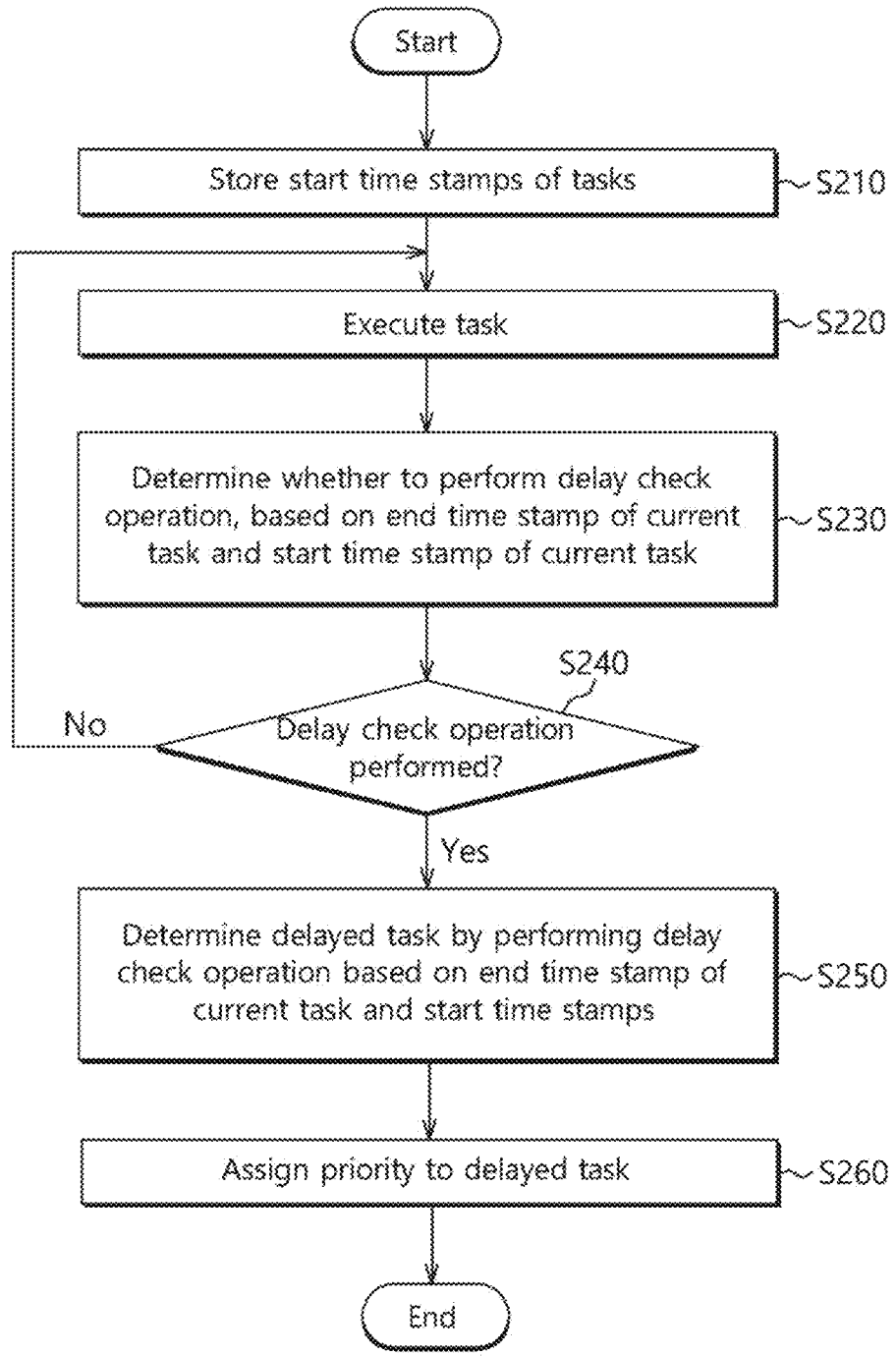
FIG. 5 is a flow chart illustrating a method for operating the memory system of FIG. 1, in accordance with an embodiment.

FIG. 5 is an example of a flow chart of a method for operating the memory system 100 of FIG. 1 in accordance with an embodiment.

Referring to FIG. 5, at step S210, the TS recording circuit 111 may store the start time stamps RTS of generated tasks.

At step S220, the task processing circuit 113 may execute a task. The task processing circuit 113 may execute the task depending on the priority thereof and the order in which the task is queued.

At step S230, the delay check circuit 112 may determine whether to perform a delay check operation, based on the end time stamp of the current task and the start time stamp RTS of the current task. The delay check circuit 112 may determine whether to perform a delay check operation, by calculating the difference between the end time stamp of the current task and the start time stamp RTS of the current task, as the execution time of the current task, and comparing the execution time with a check threshold time. The delay check circuit 112 may determine to perform a delay check operation, when the execution time of the current task exceeds the check threshold time. The delay check circuit 112 may determine to skip a delay check operation, when the execution time of the current task is shorter than the check threshold time.

At step S240, the process may proceed depending on whether a delay check operation is to be performed or not. In the case where it is determined that a delay check operation is not to be performed, the process may proceed to the step S220. In the case where it is determined that a delay check operation is to be performed, the process may proceed to step S250.

At the step S250, the delay check circuit 112 may determine a delayed task by performing a delay check operation based on the end time stamp of the current task and start time stamps RTS. When performing the delay check operation, the delay check circuit 112 may calculate the delay times of tasks by comparing the end time stamp and the respective start time stamps RTS, and may determine a delayed task based on the delay times. The delay check circuit 112 may determine a delayed task by comparing the respective delay times with a delay threshold time. The delay check circuit 112 may perform the delay check operation for only normal tasks.

At step S260, the task processing circuit 113 may assign a priority to the delayed normal task. The task processing circuit 113 may queue the delayed normal task in the priority queue PQ, and may execute the delayed task depending on the order in which the delayed task is queued in the priority queue PQ.

Figure 6:
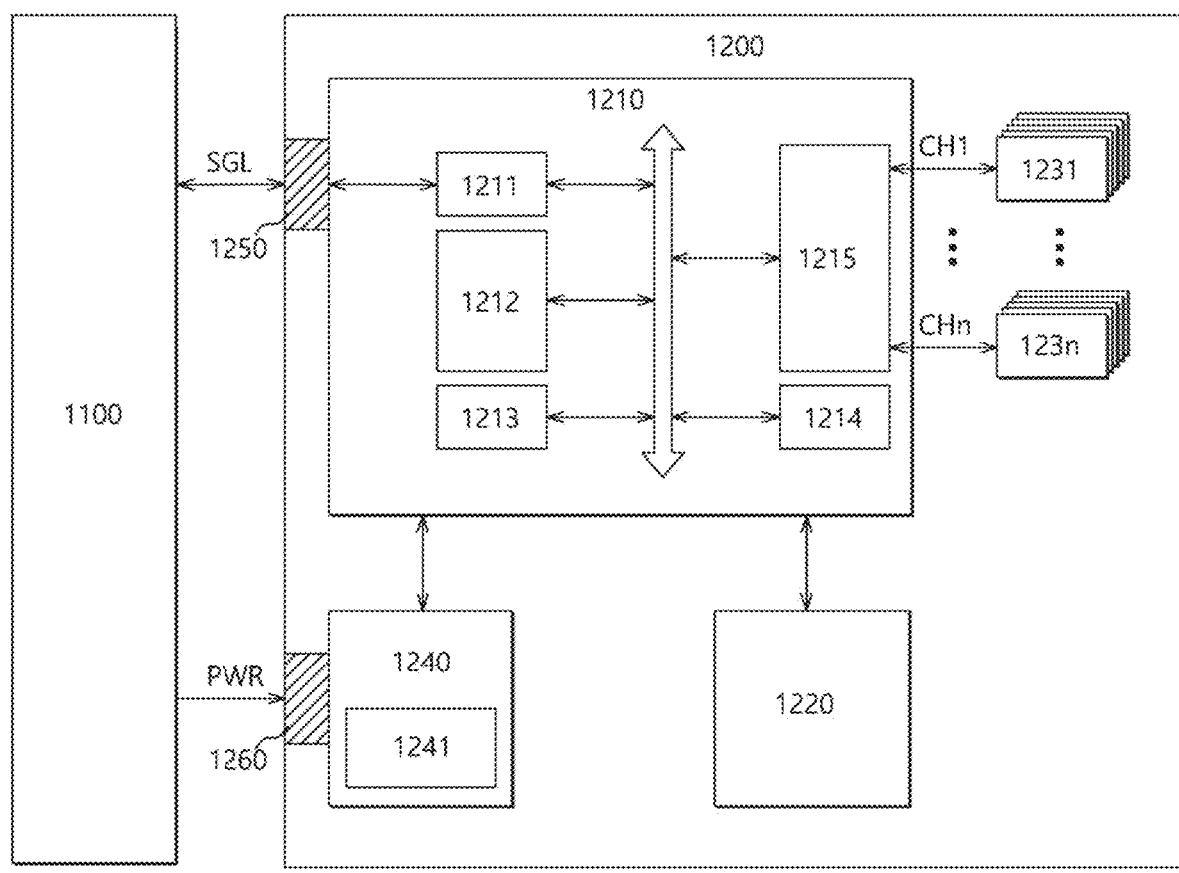
FIG. 6 is a diagram illustrating a data processing system including a solid state drive (SSD) in accordance with an embodiment.

FIG. 6 is a diagram illustrating a data processing system 1000 including a solid state drive (SSD) 1200 in accordance with an embodiment. Referring to FIG. 6, the data processing system 1000 may include a host device 1100 and the SSD 1200.

The SSD 1200 may include a controller 1210, a buffer memory device 1220, a plurality of nonvolatile memory devices 1231 to 123*n*, a power supply 1240, a signal connector 1250, and a power connector 1260.

The controller 1210 may control general operations of the SSD 1200. The controller 1210 may comprise the controller 110 shown in FIG. 1.

The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The ECC unit 1214 may generate the parity data of data to be transmitted to at least one of the nonvolatile memory devices 1231 to 123*n*. The generated parity data may be stored together with the data in the nonvolatile memory devices 1231 to 123*n*. The ECC unit 1214 may detect an error of the data read from at least one of the nonvolatile memory devices 1231 to 123*n*, based on the parity data. If a detected error is within a correctable range, the ECC unit 1214 may correct the detected error.

The memory interface unit 1215 may provide control signals such as commands and addresses to at least one of the nonvolatile memory devices 1231 to 123*n*, according to control of the control unit 1212. Moreover, the memory interface unit 1215 may exchange data with at least one of the nonvolatile memory devices 1231 to 123*n*, according to control of the control unit 1212. For example, the memory interface unit 1215 may provide the data stored in the buffer memory device 1220, to at least one of the nonvolatile memory devices 1231 to 123*n*, or provide the data read from at least one of the nonvolatile memory devices 1231 to 123*n*, to the buffer memory device 1220.

The buffer memory device 1220 may temporarily store data to be stored in at least one of the nonvolatile memory devices 1231 to 123*n*. Further, the buffer memory device 1220 may temporarily store the data read from at least one of the nonvolatile memory devices 1231 to 123*n*. The data temporarily stored in the buffer memory device 1220 may be transmitted to the host device 1100 or at least one of the nonvolatile memory devices 1231 to 123*n* according to control of the controller 1210.

The nonvolatile memory devices 1231 to 123*n* may be used as storage media of the SSD 1200. The nonvolatile memory devices 1231 to 123*n* may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 7:
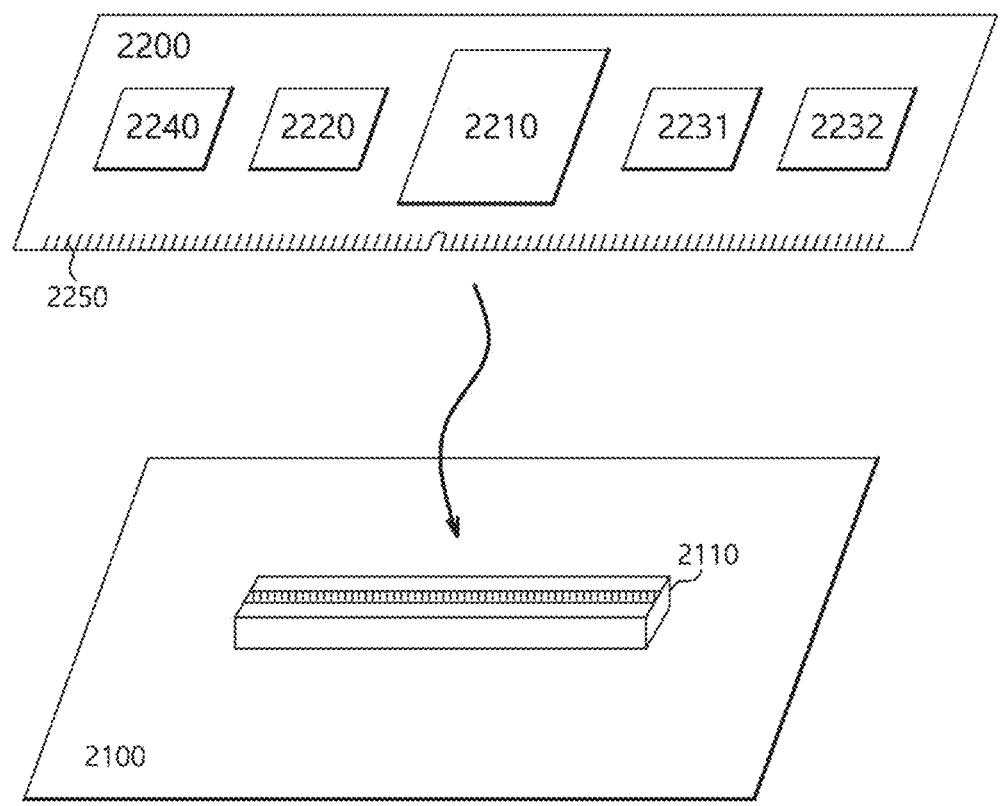
FIG. 7 is a diagram illustrating a data processing system including a memory system in accordance with an embodiment.

FIG. 7 is a diagram illustrating a data processing system 2000 including a memory system 2200 in accordance with an embodiment. Referring to FIG. 7, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 6.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 8:
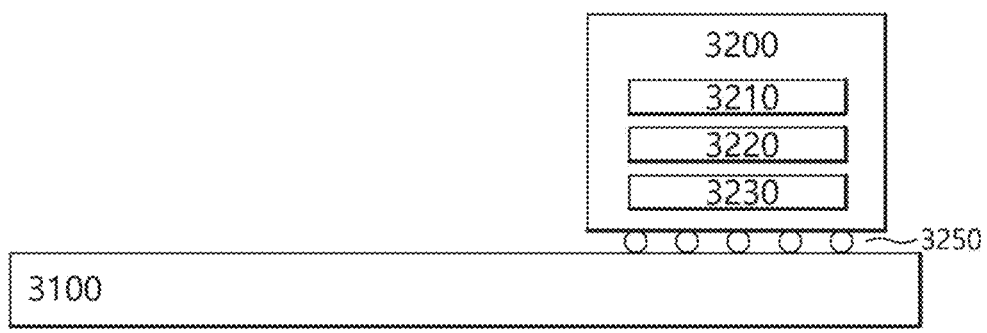
FIG. 8 is a diagram illustrating a data processing system including a memory system in accordance with an embodiment.

FIG. 8 is a diagram illustrating a data processing system 3000 including a memory system 3200 in accordance with an embodiment. Referring to FIG. 8, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 6.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 9:
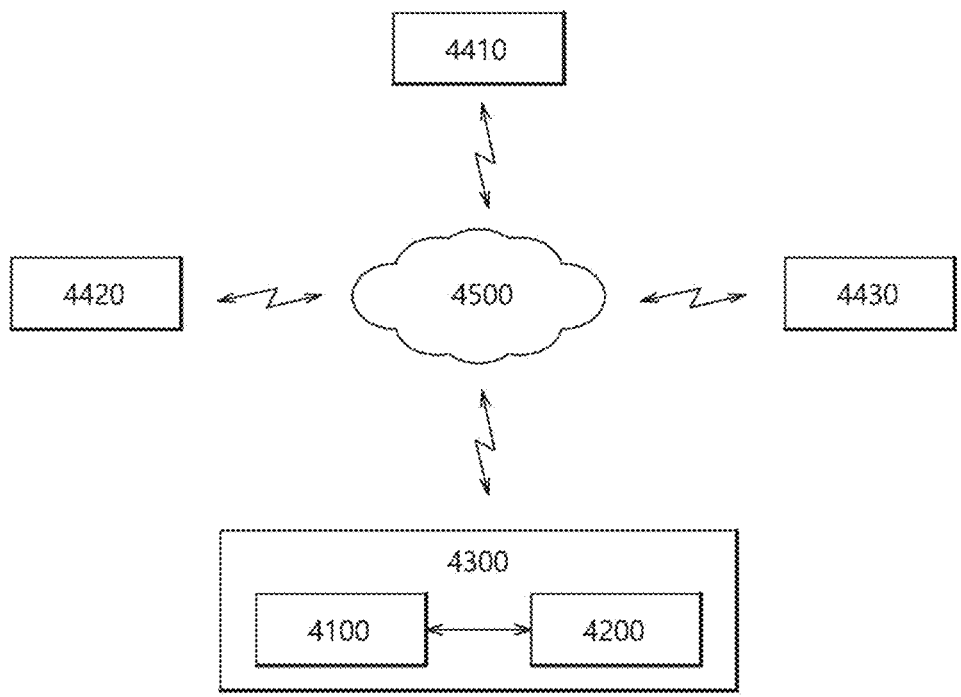
FIG. 9 is a diagram illustrating a network system including a memory system in accordance with an embodiment.

FIG. 9 is a diagram illustrating a network system 4000 including a memory system 4200 in accordance with an embodiment. Referring to FIG. 9, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 100 shown in FIG. 1, the memory system 1200 shown in FIG. 6, the memory system 2200 shown in FIG. 7 or the memory system 3200 shown in FIG. 8.

Figure 10:
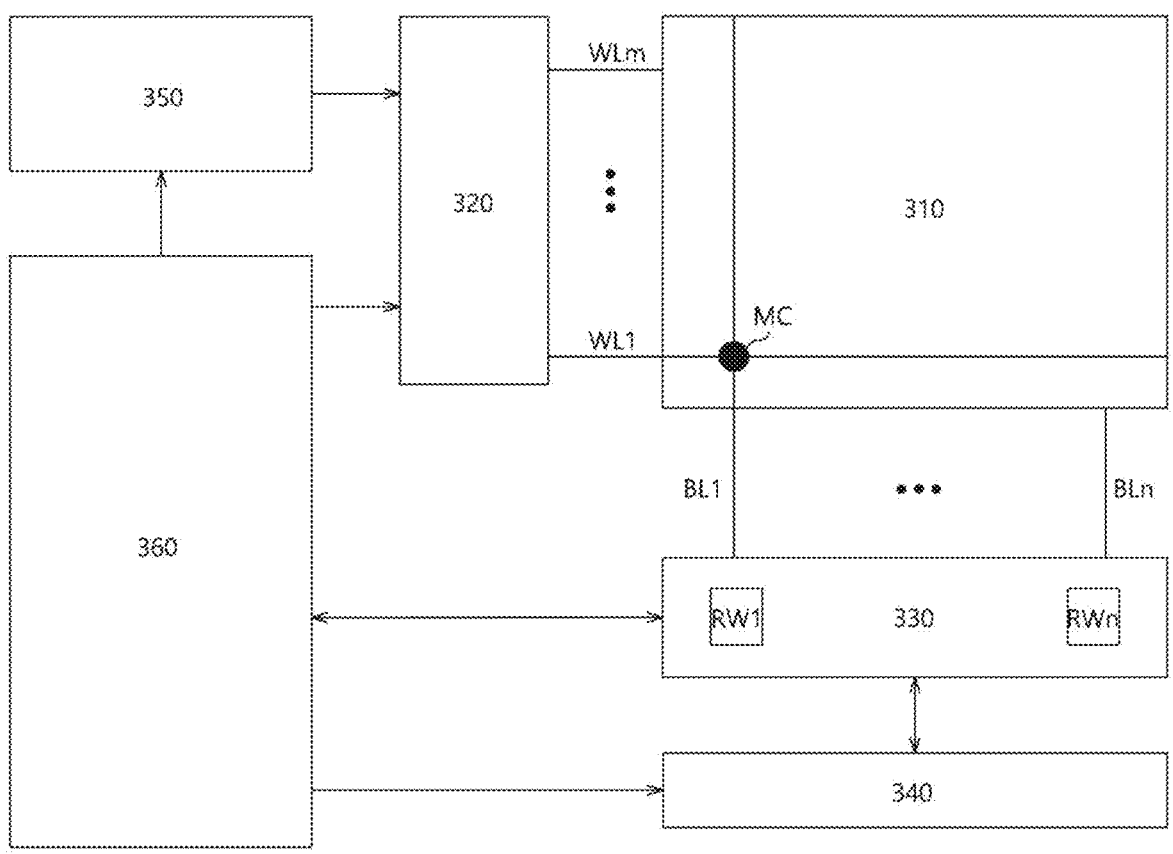
FIG. 10 is a block diagram illustrating a nonvolatile memory device included in a memory system in accordance with an embodiment.

FIG. 10 is a block diagram illustrating a nonvolatile memory device 300 included in a memory system in accordance with an embodiment. Referring to FIG. 10, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it will be understood to those skilled in the art that the embodiments described are examples only. Accordingly, the memory system and the operating method thereof described herein should not be limited based on the described embodiments.

What is claimed is:

1. A memory system comprising:
a controller configured to store start time stamps of a plurality of tasks, determine a delayed task among the tasks by performing a delay check operation based on an end time stamp of a current task and the start time stamps, and assign a priority to the delayed task.

2. The memory system according to claim 1, wherein, when performing the delay check operation, the controller calculates delay times of the plurality of tasks by comparing the end time stamp and the start time stamps respectively, and determines the delayed task based on the delay times.

3. The memory system according to claim 2, wherein the controller determines the delayed task by comparing the delay times with a delay threshold time respectively.

4. The memory system according to claim 1, wherein the controller includes a priority queue, inserts the delayed task in the priority queue, and executes the delayed task depending on an order in which the delayed task is queued in the priority queue.

5. The memory system according to claim 4, wherein the controller further includes a normal queue, and executes one or more high priority tasks queued in the priority queue, preferentially to normal tasks queued in the normal queue.

6. The memory system according to claim 5, wherein the controller determines the delayed task among the normal tasks when performing the delay check operation.

7. The memory system according to claim 1, wherein the controller determines whether to perform the delay check operation, based on the end time stamp and start time stamp of the current task.

8. The memory system according to claim 7, wherein the controller selectively performs the delay check operation by calculating a difference between the end time stamp and the start time stamp, as an execution time of the current task, and comparing the execution time with a check threshold time.

9. The memory system according to claim 8, wherein the controller performs the delay check operation when the execution time exceeds the check threshold time.

10. The memory system according to claim 8, wherein the controller skips the delay check operation when the execution time is shorter than the check threshold time.

11. A method for operating a memory system including a controller, comprising:
storing, by the controller, start time stamps of a plurality of tasks;
determining, by the controller, a delayed task among the tasks by performing a delay check operation based on an end time stamp of a current task and the start time stamps; and
assigning, by the controller, a priority to the delayed task.

12. The method according to claim 11, wherein the performing of the delay check operation comprises:
calculating, by the controller, delay times of the plurality of tasks by comparing the end time stamp and the start time stamps respectively; and
determining, by the controller, the delayed task based on the delay times.

13. The method according to claim 12, wherein the determining of the delayed task comprises:
determining, by the controller, the delayed task by comparing the delay times with a delay threshold time respectively.

14. The method according to claim 11, further comprising:
inserting, by the controller, the delayed task in a priority queue; and
executing, by the controller, the delayed task depending on an order in which the delayed task is queued in the priority queue.

15. The method according to claim 14, further comprising:
executing, by the controller, one or more high priority tasks queued in the priority queue, preferentially to normal tasks queued in a normal queue.

16. The method according to claim 11, wherein the determining of the delayed task comprises:
determining, by the controller, whether to perform the delay check operation, based on the end time stamp and start time stamp of the current task.

17. The method according to claim 16, wherein the performing of the delay check operation comprises:
calculating, by the controller, a difference between the end time stamp and the start time stamp, as an execution time of the current task; and
selectively performing, by the controller, the delay check operation by comparing the execution time with a check threshold time.

18. The method according to claim 17, wherein the selectively performing of the delay check operation comprises:
performing, by the controller, the delay check operation when the execution time exceeds the check threshold time.

19. The method according to claim 17, wherein the selectively performing of the delay check operation comprises:
skipping, by the controller, the delay check operation when the execution time is shorter than the check threshold time.

20. A memory system comprising:
a memory device; and
a controller suitable for queuing tasks in priority and normal queues according to priorities of the tasks, and controlling the memory device to perform operations primarily according to queued order of the tasks in the priority queue and secondarily according to queued order of the tasks in the normal queue,
wherein the controller moves and queues into the priority queue a task queued in the normal queue when a difference between an end time of a currently completed task and a start time of the task queued in the normal queue is longer than a predetermined time.

* * * * *